United States Patent [19]

Beatty et al.

[11] Patent Number: 4,799,760
[45] Date of Patent: Jan. 24, 1989

[54] STRAIN RELIEF APPARATUS

[75] Inventors: Johnny W. Beatty, Denver; Brian A. DiMarco, Taylorsville, both of N.C.

[73] Assignee: Siecor Corporation, Hickory, N.C.

[21] Appl. No.: 161,678

[22] Filed: Feb. 29, 1988

[51] Int. Cl.⁴ .............................................. G02B 6/44
[52] U.S. Cl. .............................. 350/96.23; 350/96.20
[58] Field of Search ............... 350/96.20, 96.21, 96.22, 350/96.23

[56] References Cited

U.S. PATENT DOCUMENTS

| | | | |
|---|---|---|---|
| 4,288,107 | 9/1981 | Schwartze | 285/137 R |
| 4,298,415 | 11/1981 | Nolf | 156/85 |
| 4,339,171 | 7/1982 | Makuch | 350/96.20 |
| 4,589,727 | 5/1986 | Williams | 350/96.23 X |
| 4,610,503 | 9/1986 | Miyazaki et al. | 350/96.20 |
| 4,626,067 | 12/1986 | Watson | 350/96.20 |
| 4,657,346 | 4/1987 | Berry et al. | 350/96.20 X |

Primary Examiner—John D. Lee
Assistant Examiner—Phan T. Heartney
Attorney, Agent, or Firm—J. David Abernethy

[57] ABSTRACT

A strain relief apparatus, particularly useful for separating individual optical fibers in a multi-fiber optical cable. Optical fibers from the fiber optic cable are fed through the center of a wedging device and into separate tubes. A coupler wedges first and second members against the wedging device, securing strength members, such as aramid fibers from the fiber optic cable and tubes, between the first and second members and the wedging member.

7 Claims, 2 Drawing Sheets 4,799,760

STRAIN RELIEF APPARATUS

BACKGROUND OF THE INVENTION

1. Field of the Invention.

The field of the invention is apparatus for connecting fiber optic cables or splitting off individual fibers from multi-fiber cables, or the use of such devices with other communications media.

2. Background of the Invention.

Changes in communication activity in a communications network often require the splitting off of individual communication members from a trunk cable. The invention is chiefly aimed at the splitting off of individual optical fibers from a multi-fiber optical waveguide cable, although the invention could be applied to other communications cables.

The creation of multiple small, individual fiber cables from a trunk, or multi-fiber, optical cable requires that the strain carrying members, usually aramid fibers such as Kevlar, be affixed in some manner to prevent breaking of the optical fibers at the division point. Optical cables usually contain such strength members to allow the craftsperson to pull upon the strength members, instead of the optical fibers, when pulling a cable. A former practice is to strip a portion of the jacket from a multi-fiber cable, arrange the strength members into different groups, and feed an optical fiber plus a group of the strength members through a hollow jacket. However, it is time consuming and somewhat difficult to feed the strength members through a hollow jacket, particularly if the required length of optical fiber (optical waveguide) is long. The aramid fibers must then be secured in some fashion. Therefore, a need exists for a coupler for this purpose which may be completed in a short amount of time, reducing labor costs.

BRIEF SUMMARY OF THE INVENTION

Accordingly, the invention provides for a strain relief apparatus having first and second members each having (i) an outer surface, (ii) a first end, and (iii) an inner surface delimiting a central bore, the inner surface tapered so that the bore diameter decreases from the first end toward the middle portion of the member. The apparatus also contains a wedging member having (i) first and second ends, (ii) an outer surface tapering from wide to narrow from the wedging member middle portion toward the wedging member first and second ends, and (iii) a central bore, the wedging member first end inserted within the first member bore at the first member first end, and the wedging member second end inserted within the second member bore at the second member first end. The apparatus further provides a first tube and a second tube, the wedging member located between the first and second tubes; a plurality of first strength members within the interior of the first tube and extending between the wedging member outer surface and the first member inner surface; a plurality of second strength members within the interior of the second tube and extending between the wedging member outer surface and the second member inner surface; one or more communication members, such as optical fibers, extending from the interior of the first tube through the central bores of the first member, wedging member, and second member, respectively, and each communications member proceeding into the interior of a tube such as the second tube; and urging means for urging the first and second members toward each other, so that the first strength members are tightly held between the wedging member outer surface and first member inner surface, and the second strength members are tightly held between the wedging member outer surface and the second member inner surface.

The urging means may be a coupler disposed around the first and second members, the coupler having a threaded inner surface and the second member having a threaded outer surface, and the first member and the coupler having abutting shoulders. If more than one communications member is present in the first tube, each additional communications member may be routed into a third tube. In that case, strength members from the third tube will be tightly held in the same fashion as strength members from the second tube. Wrench flats may be located on the first and second members to prevent rotation of the first and second members when the coupler is rotated to tighten the first and second members together.

BRIEF DESCRIPTION OF THE DRAWINGS

Reference is now made to the drawings in which.

DETAILED DESCRIPTION OF THE PREFERRED EMBODIMENT

Figure 1:
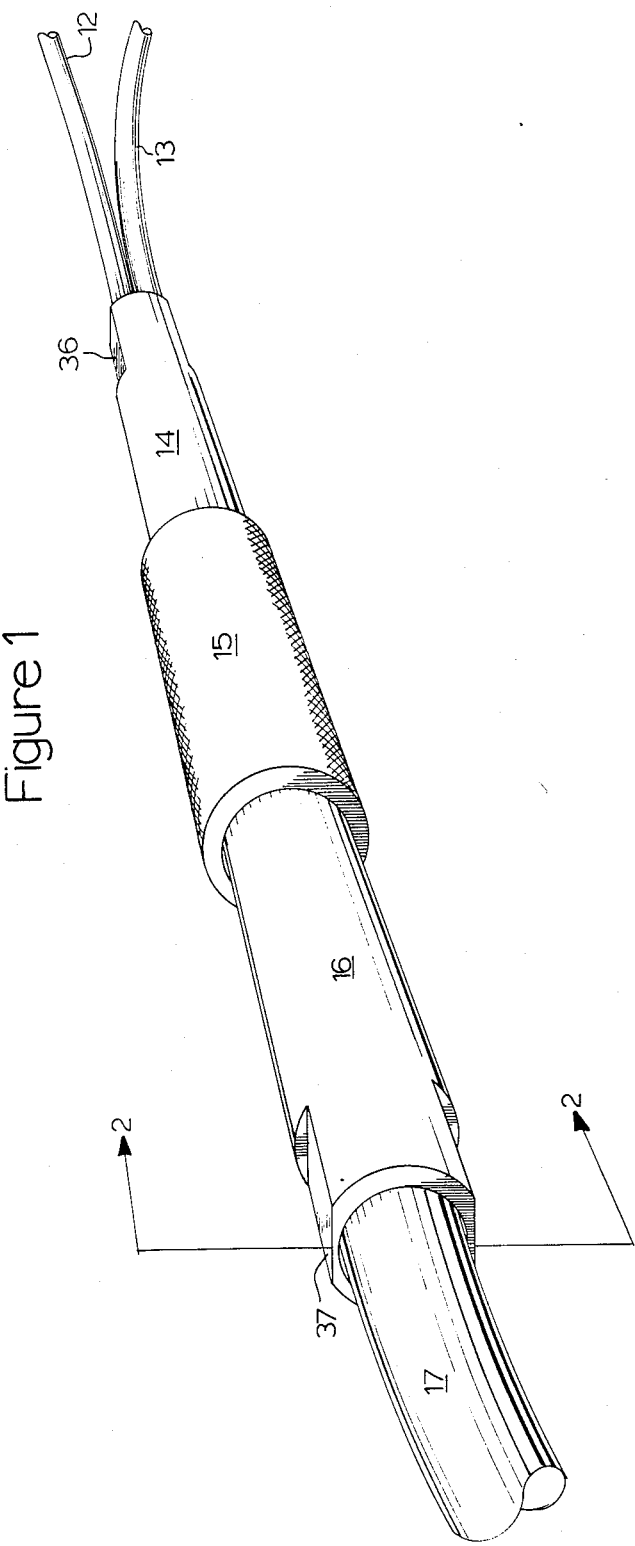
FIG. 1 is a perspective view of the strain relief apparatus.

In FIG. 1, coupler 15 is disposed around first member 16 and second member 14, respectively. First tube 17 proceeds into the central bore of first member 16 delimited by inner surface 29 of first member 16. Second and third tubes, 12, and 13, respectively, exit from the central bore of second member 14 delimited by inner surface 27 of second member 14. As will later be discussed, first and second members 16 and 14 are urged towards each other responsive to rotation of coupler 15, so it is desirable to provide wrench flat 37 on first member 16, and wrench flat 36 on second member 14, to prevent rotation of the first and second members while coupler 15 is being rotated.

Figure 2:
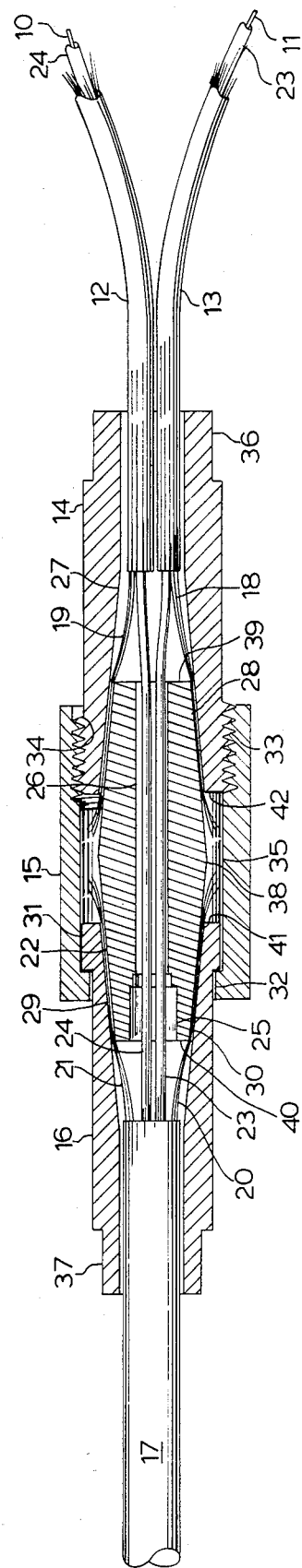
FIG. 2 is a sectional view along line 2—2 of FIG. 1.

Referring to FIG. 2, optical fibers 10 and 11 proceed from the interior of first tube 17 through the central bores of first member 16, wedging member 22, and second member 14, respectively, and thereafter first optical fiber 10 proceeds into second tube 12 and second optical fiber 11 proceeds into third tube 13, accomplishing the object of splitting off optical fibers 10 and 11 from first tube 17.

Coatings 24 and 23, respectively, are coatings placed on first and second optical fibers 10 and 11, respectively.

The invention further provides wedging member 22, which has indentation 25 at its first end 40 to allow easy insertion of the optical fibers. The inner surface 26 of wedging member 22 delimits its central bore.

The outer surface of wedging member 22 tapers from wide to narrow from its middle portion 38 toward its first end 40 and second end 39. The inner surface 29 of first member 16 is tapered so that its bore diameter decreases from first member first end 41 toward the middle portion of first member 16, and the inner surface 27 of second member 14 is tapered so that its bore diameter decreases from wide to narrow from its first end 42 toward the middle portion of second member 14.

Aramid fiber strength members 20, 21 proceed from within the interior of first tube 17 and are threaded between outer surface 30 of wedging member 22 and inner surface 29 of first member 16. Aramid fiber strength members 19 from within the interior of second tube 12 and aramid fiber strength members 18 proceeding from within the interior of third tube 13 are threaded between outer surface 28 of wedging member 22 and inner surface 27 of second member 14.

Coupler 15 contains threads 33 on its inner surface 35, and second member 14 contains threads 34 on its outer surface, to allow coupler 15 to rotatably tighten onto second member 14. Coupler shoulder 32 abuts first member shoulder 31.

In practice, coupler 15 is slid over the multi-fiber cable having first tube 17 to be bifurcated. A portion of first tube 17 is stripped to reveal optical fibers 10 and 11 and strength members 20, 21. First member 16 is then slid over first tube 17. Optical fibers 10, 11 are then fed through wedging member 22. Second tube 12 and third tube 13 are stripped to reveal strength members 18, 19. Second member 14 is then slid over second tube 12 and third tube 13. Optical fibers 10, 11 are then fed through second tube 12 and third tube 13, respectively. Strength members 20, 21, 18, and 19 are trimmed to reach approximately middle portion 35 of wedging member 22. First member 16 and second member 14 are then pulled over wedging member 22, the external taper of wedging member 22 and the internal tapers of first member 16 and second member 14 approximately matching. Coupler 15 is then threaded onto second member 14, and in the process, second member 14 is pulled toward first member 16 by threads 33, 34, and first member 16 is pulled toward second member 14 by abutting shoulders 32, 31. This process tightly compresses first member 16 and second member 14 against the exterior of wedging member 22, tightly holding the strength members therebetween.

It is preferred that wedging member 22, first member 16, second member 14, and coupler 15 all be metallic. The outer surface of coupler 15 should be preferably be knurled for easy handling.

It will be readily understood that, although the example calls for the separation of a two fiber cable, the invention may easily be applied to cables having a greater number of fibers therein.

What is claimed is:

1. A strain relief apparatus, comprising:
   (a) first and second members each having (i) an outer surface, (ii) a first end, and (iii) an inner surface delimiting a central bore, the inner surface tapered so that the bore diameter decreases from the first end toward the middle portion of the member;
   (b) a wedging member having (i) first and second ends, (ii) an outer surface tapering from wide to narrow from the wedging member middle portion toward the wedging member first and second ends, and (iii) a central bore, the wedging member first end inserted within the first member bore at the first member first end, and the wedging member second end inserted within the second member bore at the second member first end;
   (c) a first tube and a second tube, the wedging member located between the first and second tubes;
   (d) a plurality of first strength members within the interior of the first tube and extending between the wedging member outer surface and the first member inner surface;
   (e) a plurality of second strength members within the interior of the second tube and extending between the wedging member outer surface and the second member inner surface;
   (f) a first communications member extending from the interior of the first tube through the central bores of the first member, wedging member, and second member, respectively, and into the interior of the second tube; and
   (g) urging means for urging the first and second members toward each other, whereby (i) the first strength members are tightly held between the wedging member outer surface and first member inner surface, and (ii) the second strength members are tightly held between the wedging member, outer surface and the second member inner surface.

2. A strain relief apparatus as recited in claim 1, wherein the urging means comprises a coupler.

3. A strain relief apparatus as recited in claim 2, wherein the coupler is disposed around the first and second members, the coupler having a threaded inner surface and the second member having a threaded outer surface, and the first member and the coupler having abutting shoulders.

4. A strain relief apparatus as recited in claim 3, further comprising means for preventing rotation of the first and second members responsive to rotation of the coupler.

5. A strain relief apparatus as recited in claim 1, further comprising:
   (a) a third tube, the wedging member located between the first and third tubes;
   (b) a plurality of third strength members within the interior of the third tube and extending between the wedging member outer surface and the second member inner surface; and
   (c) a second communications member extending from the interior of the first tube through the central bores of the first member, wedging member and second member, respectively, and into the interior of the third tube.

6. A strain relief apparatus as recited in claim 4, wherein the first and second communications members are optical waveguides.

7. A strain relief apparatus as recited in claim 1, wherein the first communications member is an optical waveguide.

* * * * *